Feb. 20, 1968   A. H. ETT ET AL   3,370,176
RADIATION-SENSITIVE MEANS FOR DETECTING FLAWS IN
RADIATION-TRANSMISSIVE MATERIALS
Filed Nov. 10, 1964   2 Sheets-Sheet 1
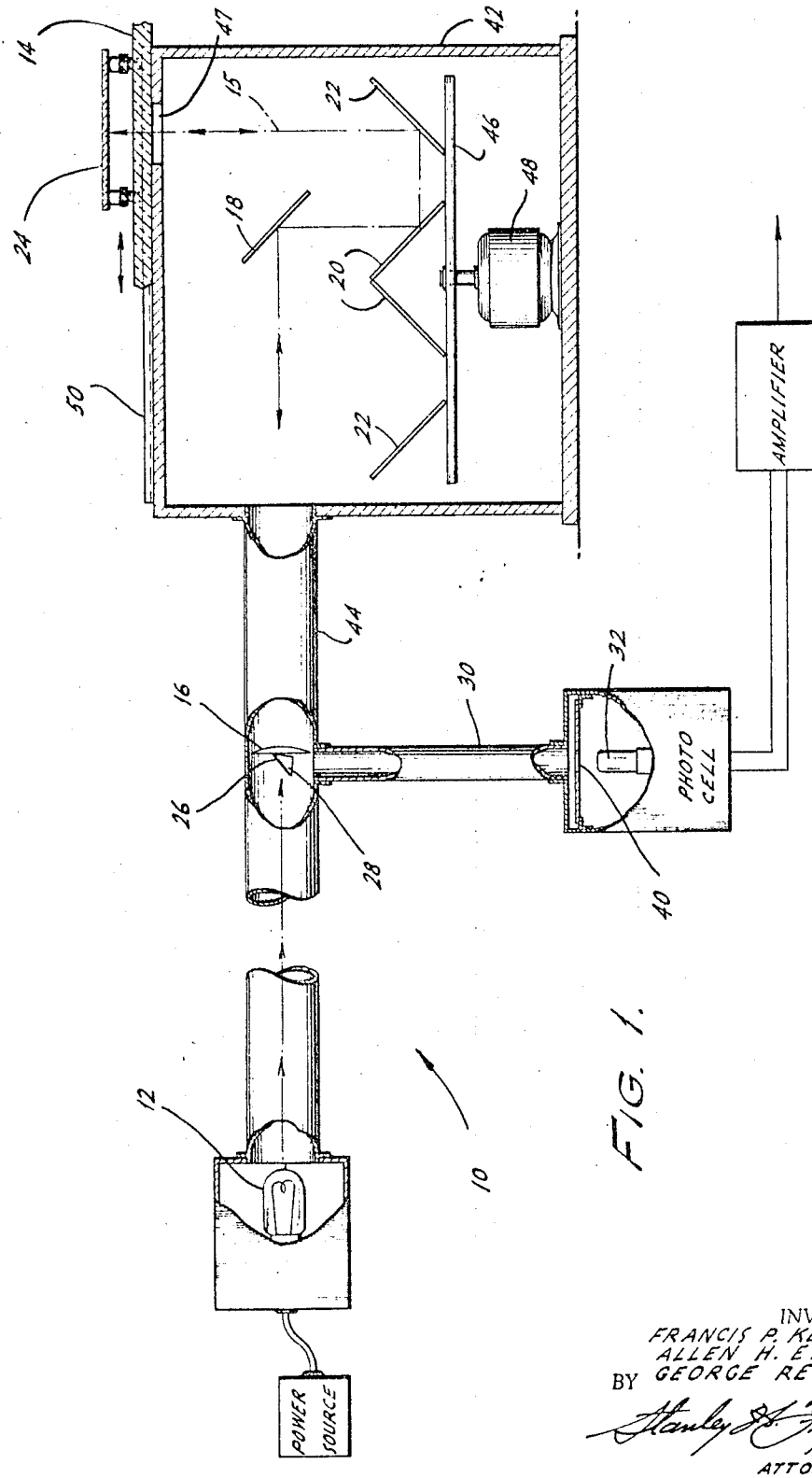
INVENTORS
FRANCIS P. KEIPER, JR.
ALLEN H. ETT
BY GEORGE REVESZ
ATTORNEY

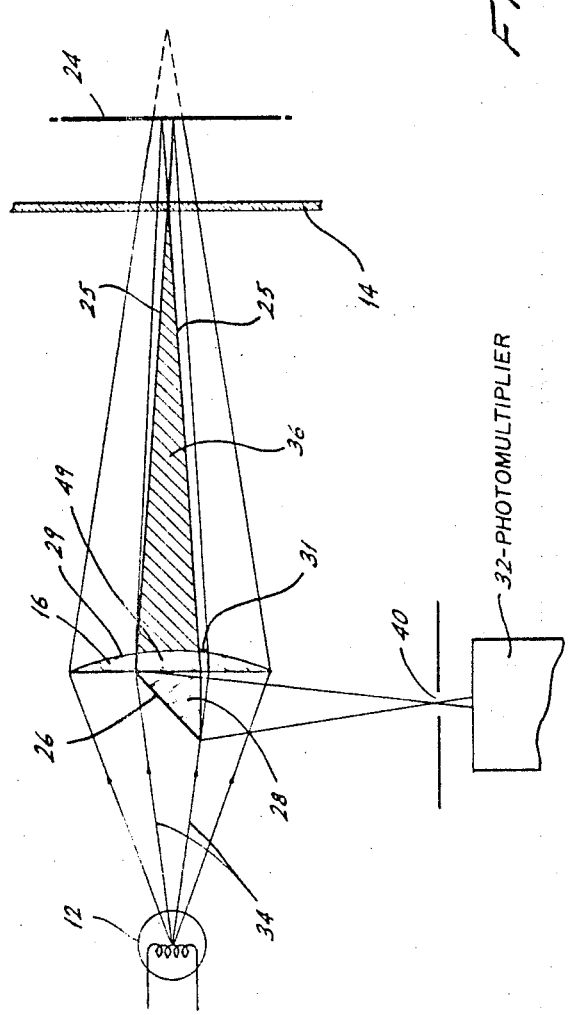
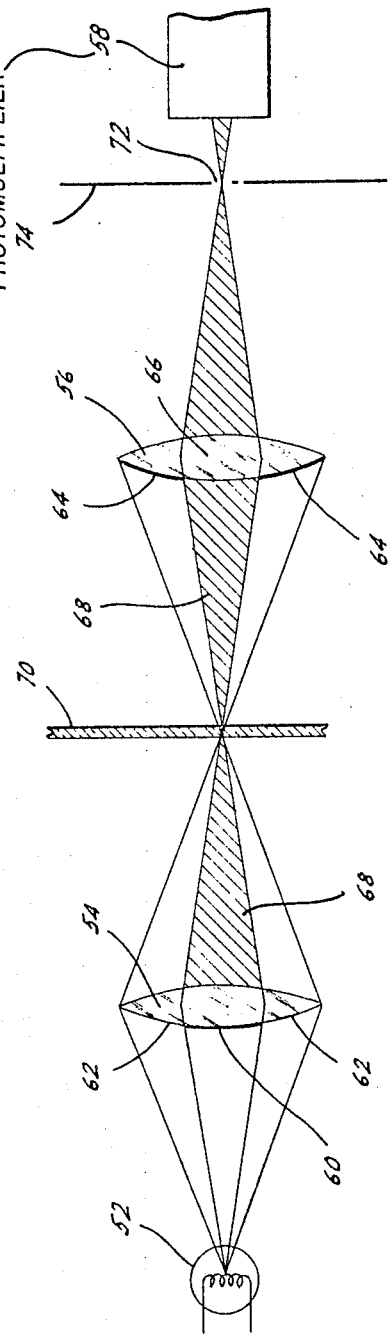

3,370,176
RADIATION-SENSITIVE MEANS FOR DETECTING FLAWS IN RADIATION-TRANSMISSIVE MATERIALS
Alien H. Ett, Bethesda, Md., Francis P. Keiper, Jr., Oreland, Pa., and George Revesz, Bala Cynwyd, Pa., assignors to Philco-Ford Corporation, a corporation of Delaware
Filed Nov. 10, 1964, Ser. No. 410,090
5 Claims. (Cl. 250—219)

ABSTRACT OF THE DISCLOSURE

Apparatus for detecting flaws in radiation-transmissive material, comprising a pair of spaced lens elements, or their optical equivalent, constructed and arranged to focus radiation on material interposed therebetween, and which in cooperation with associated obturating means produce an optical system which is non-transmissive of radiation in the absence of a flaw contained in the interposed material.

---

This invention relates to a method of and apparatus for detecting flaws in transparent and reflective materials and more particularly to novel and improved optical systems for use in such apparatus.

The term "radiation-transmissive materials" is used in this disclosure as a generic expression to mean materials which transmit radiation either reflectively or by passage of the radiation through the material.

While the invention will be illustrated and described in connection with the detection of flaws in sheet glass, it should be understood that such application is merely illustrative of one field of utility of the invention and is not restrictive thereof.

Prior art apparatus for inspecting glass and other transparent and reflective materials is both complicated and expensive, and lacks the sensitivity required to detect flaws of small size. Because of these deficiencies, much of current-day inspection of such materials is carried out manually, a procedure which is both time consuming and expensive.

Accordingly, it is a general object of this invention to provide apparatus for flaw detection which overcomes the deficiencies and difficulties of the prior art.

It is a further object of this invention to provide flaw-detecting apparatus which is inexpensive and simple in construction and which has a high order of sensitivity permitting the detection of extremely minute flaws.

These and other objects within contemplation will be more readily understood by reference to the accompanying detailed description and drawings, in which:

FIGURE 1 is a partly diagrammatic view of apparatus embodying features of the instant invention designed for use in detecting flaws in sheet glass;

FIGURE 2 is a diagrammatic view of the optical system employed in the apparatus of FIGURE 1; and FIGURE 3 is a diagrammatic view of an alternative optical system.

The invention in its apparatus aspect consists of the provision of a novel and highly sensitive electro-optical system for detecting variations in radiation-transmission, caused by flaws contained in transparent or reflective materials interposed in the optical path. The invention is featured by the provision of a radiation-projection system which in the absence of an interposed flaw exhibits a zero-radiation output and which in the presence of such a flaw becomes radiation transmissive. This "on-off" feature or dark field system, permits the construction of apparatus having increased sensitivity capable of detecting imperfections of extremely minute size. Moreover, it is possible using such apparatus readily to perceive the flaw-indicating signal by the naked eye, thus eliminating the necessity of using auxiliary amplifying and light discriminating circuits as required by the prior art.

The optical apparatus for achieving these ends consists of single or multiple lens systems, and associated stop means, designed cooperatively to form a radiation-transmitting system of zero-radiation output in the absence of an interposed flaw. When a seed, check, blister, crack or any other defect or flaw deflects the radiation beam from the original path established by the optical system radiation output results. As noted, the output signal may itself be used as a visual indication of the presence of a flaw or may be used to actuate any desired form of indicator or mechanism for marking or rejecting the material containing the flaw.

Referring to FIGURE 1 of the drawing, a preferred form of the invention is shown embodied in apparatus 10 designed for use in the detection of flaws in sheet glass. The radiation source for the optical system of the apparatus is a conventional arc lamp 12 which provides a concentrated spot source of radiation. A lamp found to provide satisfactory illumination for purposes of the invention was a 100 watt zirconium arc light. Radiation from this source is focused onto the article being inspected, in the illustrated embodiment a sheet of glass 14, by an $f/4$ planoconvex lens 16 having a focal length of 8 inches. To permit scanning of the article by the incident light 15 the radiation is directed through a system of fixed and rotating mirrors 18, 20, 22 and 24 which scanning system, hereinafter described, constitutes the subject matter of copending application Serial No. 457,725, filed May 21, 1965, and assigned to the assignee of the present invention.

In particular accordance with the invention, lens 16 is centrally stopped or obturated to outgoing radiation by opacifying the diagonal face 26 of prism 28 interposed in the optical path between lens 16 and the radiation source 12.

The obturating pattern established by this arrangement is projected through the system and reflected back by mirror 24, onto lens 16. (See return rays 25, as seen in FIGURE 2.) Unless there is diffraction of light in the inspection area caused by flaws in the glass sheet 14 no light reaches the central region of lens 16 and no light is transmitted to prism 28 for reflection thereby down tube 30 to photocell 32.

The optical arrangement can best be understood by reference to FIGURE 2 which shows the system in diagrammatic form. For clarity of illustration the scanning portion of the apparatus is not shown. The opacified surface 26 of prism 28 produces a centrally stopped zone in lens 16 which is non-transmissive of outgoing light from source 12. As can be seen by following the ray traces 34, the light bounding the cone of darkness generated by this centrally stopped zone is reflected or folded back on itself by the mirror 24. This permits the lens system to be considerably simplified, as will be appreciated by comparison with the system of FIGURE 3, to be described. This arrangement also permits the apparatus to be disposed on one side of the article undergoing examination, thus facilitating scanning inspection by eliminating the need for two synchronized scanning systems.

To optimize the efficiency of the system, the reflecting mirror 24 is positioned inside the principal focus of lens 16. (See broken line indication of principal focus.) By this arrangement the return beam traverses a path of shorter length than the outgoing beam. To insure that no light passes through the centrally obturated region of the lens as a result of this disparity in path lengths the rearwardly presented face 29 of lens 28 may be masked along the area 31 to prevent light leakage. If the mirror 24 is positioned beyond the principal focus the shaded area imaged by the mirror on the lens is larger than the forwardly obturated region. This substantially reduces the light output of the system and adversely effects its overall sensitivity. Unless reflective articles are being inspected, in which case it is possible to have the material itself serve as the reflector, it is not feasible to locate the mirror 24 in the plane of the principal focus of the system. It has been found desirable to locate the reflector inboard of the focal point of the condensing lens 16, for the reasons stated.

By preventing transmission of light to photocell 32 in the absence of flaws, a dark field system is provided in which the photocell operates against a background of zero or minimal noise level. It is not uncommon utilizing the described system to obtain a flaw-indicating output signal of 50 volts operating against a background level of 500 millivolts to produce a system having a flaw-detecting sensitivity of 100:1.

While the embodiment illustrated in FIGURE 2 is exemplary of preferred practice, apparatus can be constructed with the reflecting mirror 24 positioned beyond the principal focus. As previously noted, if reflective material is to be inspected the material itself may serve as the reflector thus permitting its placement in the plane of the principal focus.

While it is possible to use the disclosed optical systems for detection of flaws without the use of auxiliary equipment, it is not preferred practice. Preferably the system is used with some form of scanning mechanism such, for example, as that shown in FIGURE 1 housed within enclosure 42. By resort to scanning apparatus the article 14 may be rapidly and automatically inspected. In the apparatus shown, light is projected by lens 16 onto fixed mirror 18 which reflects the beam into a system of revolving mirrors 20–22 mounted on a rotatable table 46 powered by a synchronous motor 48. By using opposed pairs of mirrors disposed at an angle of 45° to the vertical and rotating the mirrors at a speed of 1800 r.p.m. a scanning sweep frequency of 60 cycles per second is obtained. Using this scanning frequency and a beam of light focused to a ⅛″ diameter spot the entire surface of glass 14 may be inspected by maintaining a feed rate across scanning port 47 not in excess of 7½′ per minute. By increasing the rotational speed of the motor and the number of opposed pairs of mirrors the rate of traverse may be materially increased. The pane of glass 14 may be rectilinearly advanced across the scanning port 47 either manually or by mechanical means not shown. To insure that the entire lateral surface of the glass is exposed to the scanning beam, the sheet is confined between runways 50, only one of which is shown. The described scanning arrangement provides a scanning beam which is always normal to the scanned surface thereby providing for return of the beam to its point or origin. This latter feature is a required characteristic of any scanning apparatus to be used with the instant invention.

When a flaw is brought into the path of the light beam the beam is scattered resulting in passage of light through central regions 49 of lens 16. Light which traverses these regions is reflected off prism face 26 downwardly through an aperture 40 the size of which determines the resolution of the system and which is, typically, .030″ onto a photomultiplier cell 32 having an S1 response. The cell is selected to be sensitive to the radiation from arc light 12. In instances where it is desired to analyze the nature of the flaw by spectrum analysis of the response, the radiation passing through aperture 40 may be broken down into its component frequencies by a system of dichroic mirrors, not shown, and fed to associated photomultiplier tubes having the appropriate spectral sensitivity.

The optical system is arranged to focus the .030 inch aperture 40 on the object undergoing inspection to delimit the area of observation to that intercepted by a pencil of rays having this reduced cross sectional area.

An alternative optical system the construction of which is premised on method concepts of the instant invention is shown in FIGURE 3. The system comprises a source of radiation 52, a pair of axially spaced condensing lenses 54 and 56, or their optical equivalents, in combination with some type of photosensitive means such, for example, as the photomultiplier 58, for sensing the output of the system. To produce a projection system which in the absence of an interposed diffracting medium has a zero light output the lenses are constructed with inverse light-transmitting characteristics and so positioned in the optical system that the pattern projected by one is inversely imaged on the other in one-to-one correspondence. In the illustrated embodiment lens 54 is centrally stopped in the region 60 leaving peripheral regions 62 light-transmissive. Conversely, lens 56 is peripherally stopped in the region 64 and its central region 66 is light-transmissive. One convenient way of producing the desired light-transmitting and obturating patterns is to cover the regions to be opacified with black paint.

With the lenses arranged as shown in FIGURE 3, the umbra 68 generated by the centrally stopped region of lens 54 is imaged on the light-transmissive portion 66 of lense 56 resulting in zero light output at the photocell 58. When a sheet of glass 70, or other transparent object, is interposed in the optical path established by the system any flaw intercepted by the light results in deflection of light rays from their originally established path and transmission of light through region 66 of lens 56. The area of inspection is delineated by an .030″ aperture 72 provided by shutter element 74 interposed in the optical path between lens 56 and photocell 58.

The signals from the photoelectric cell may be transmitted to an amplifier, not shown, to actuate any desired form of indicator or ejector mechanism for discarding the defective object.

In summary, we have discovered that apparatus for detection of flaws in transparent and reflective materials may be simplified and the sensitivity of such apparatus materially improved by novel optical arrangements which are only transmissive of light in the presence of a flaw. By resort to arrangements in accordance with the invention, those shown in FIGURES 2 and 3 being exemplary, apparatus of extreme simplicity may be constructed.

While preferred forms of the present invention have been depicted and described, it will be understood by those skilled in the art that the invention is susceptible of changes and modifications without departing from the essential concepts thereof, and that such changes and modifications are contemplated as come with in the scope of the appended claims.

We claim:

1. Apparatus for detecting flaws in light-transmissive material, including an optical system comprising: a source of radiation; first lens means for focusing radiation from said source onto material to be inspected; stop means preventing passage of radiation through a portion of said first lens means; second lens means positioned beyond the principal focus of said first lens means receive radiation transmitted through material undergoing inspection between said first and second lens means; stop means associated with said second lens means preventing transmission through said second lens means of radiation traversing the optical path established by said first lens means and permitting transmission of radiation scattered from said path by a defect in material interposed in said path and radiation sensitive means for receiving such scattered radiation.

2. In apparatus for detecting flaws in radiation-transmissive material, an optical system comprising: a source of radiation; first lens means for focusing radiation from said source onto material to be inspected; stop means preventing transmission of radiation from said source through a central region of said first lens means; and second lens means positioned beyond the principal focus of said first lens means for receiving radiation transmitted through said material, stop means associated with said second lens means establishing a transmission pattern the inverse of that exhibited by said first lens means whereby said system is non-transmissive of radiation traversing the optical path established by said first lens means and is transmissive of radiation deflected from said path by defects in material interposed in said path; and radiation sensitive means for receiving such deflected radiation.

3. In apparatus for detecting flaws in radiation-transmissive material, an optical system comprising: a source of radiation; first lens means for focusing radiation from said source onto material to be inspected; stop means preventing transmission of radiation from said source through a central region of said first lens means; and second lens means positioned beyond the principal focus of said first lens means for receiving radiation transmitted through said material, stop means associated with said second lens means establishing a transmission pattern the inverse of that exhibited by said first lens means whereby said system is non-transmissive of radiation traversing the optical path established by said first lens means and is transmissive of radiation deflected from said path by defects in material interposed in said path; and photoelectric means for receiving deflected radiation.

4. In apparatus for detecting flaws in light-transmissive material, the optical system, comprising: a source of radiation; lens means for focusing radiation from said source onto material to be inspected; stop means interposed between said source of radiation and said lens means for partially obturating said lens means to outgoing radiation; reflective means positioned closely adjacent the plane of the principal focus of said lens for reflecting the radiation pattern established by said stop means onto said lens means in substantially one-to-one area correspondence; photosensitive means; and means for transmitting radiation passing through obturated regions of said lens means to said photosensitive means.

5. An optical system for use in apparatus for detecting flaws in light-transmissive material, comprising: a source of light; a lens and associated reflective means for focusing light from said source onto material to be inspected; stop means partially obturating said lens to light from said source, said reflective means being positioned in the optical path established by said lens to reflect the obturating pattern produced by said stop means onto said lens whereby said lens is rendered non-transmissive of reflected light in the absence of deflection from said path; prism means positioned to reflect light passing through regions of said lens lying behind said stop means; and photosensitive means for intercepting light reflected by said prism.

References Cited

UNITED STATES PATENTS

| | | | |
|---|---|---|---|
| 2,253,054 | 8/1941 | Tuttle et al. | 88—14 |
| 2,446,628 | 8/1948 | Brown | 88—14 |
| 2,870,671 | 1/1959 | Falconi | 250—236 X |
| 2,915,739 | 12/1959 | Van Luik | 88—14 |
| 3,081,665 | 3/1963 | Griss et al. | 250—219 X |
| 3,062,965 | 11/1962 | Sick | 250—236 |

WALTER STOLWEIN, *Primary Examiner.*